Figure 1:
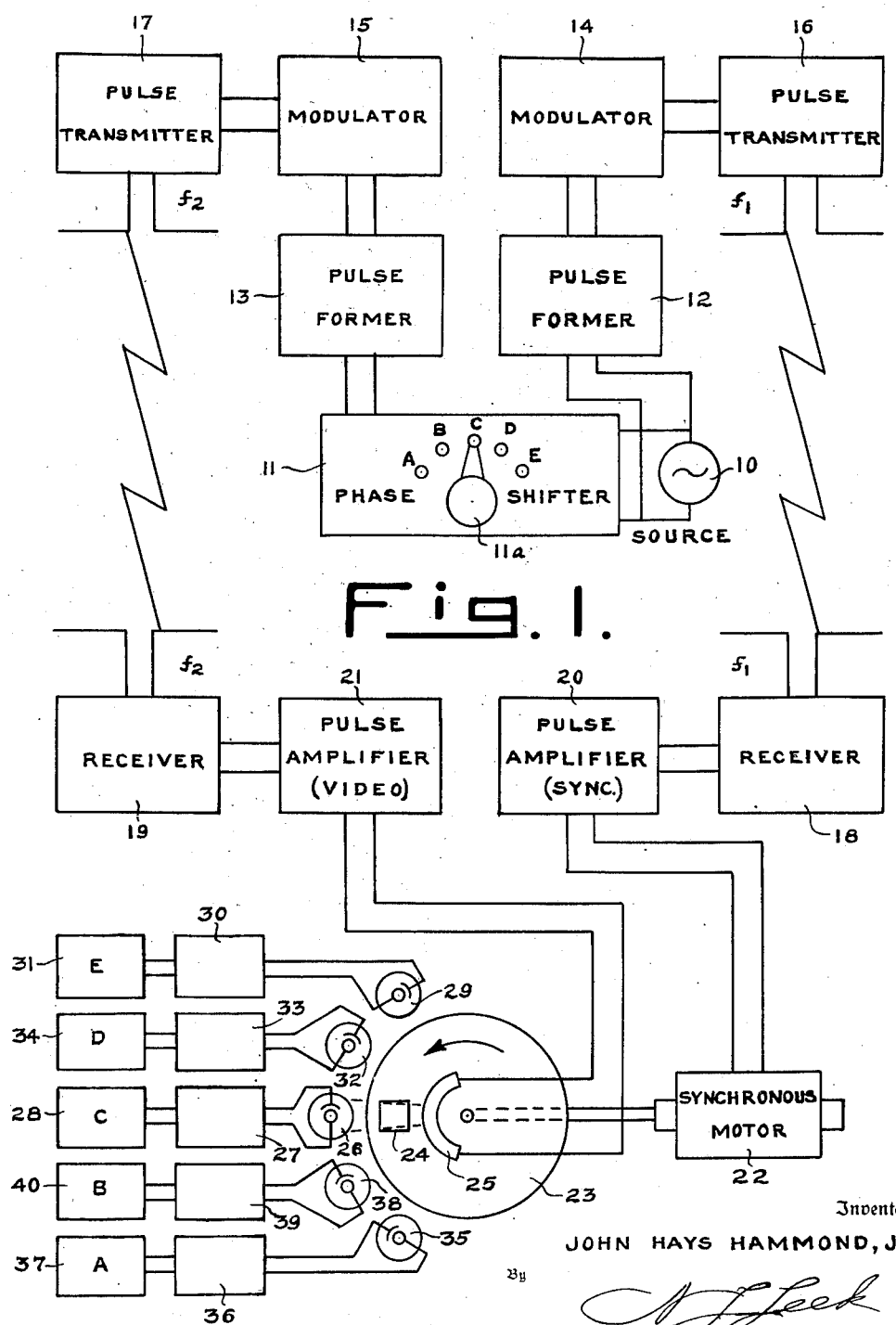

Inventor
JOHN HAYS HAMMOND, JR.

Jan. 22, 1952     J. H. HAMMOND, JR     2,583,373
SELECTIVE REMOTE-CONTROL SYSTEM
Filed May 27, 1948     2 SHEETS—SHEET 2
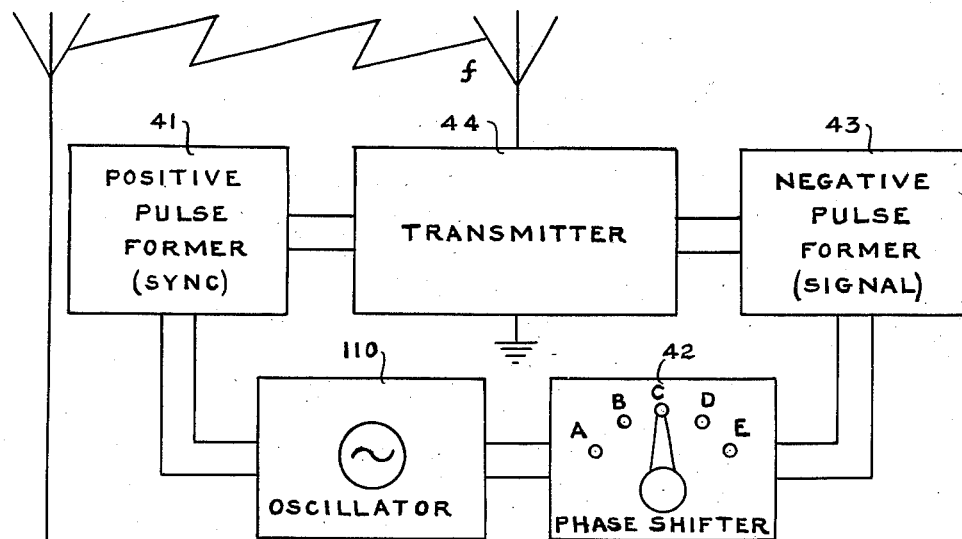
Fig. 2.
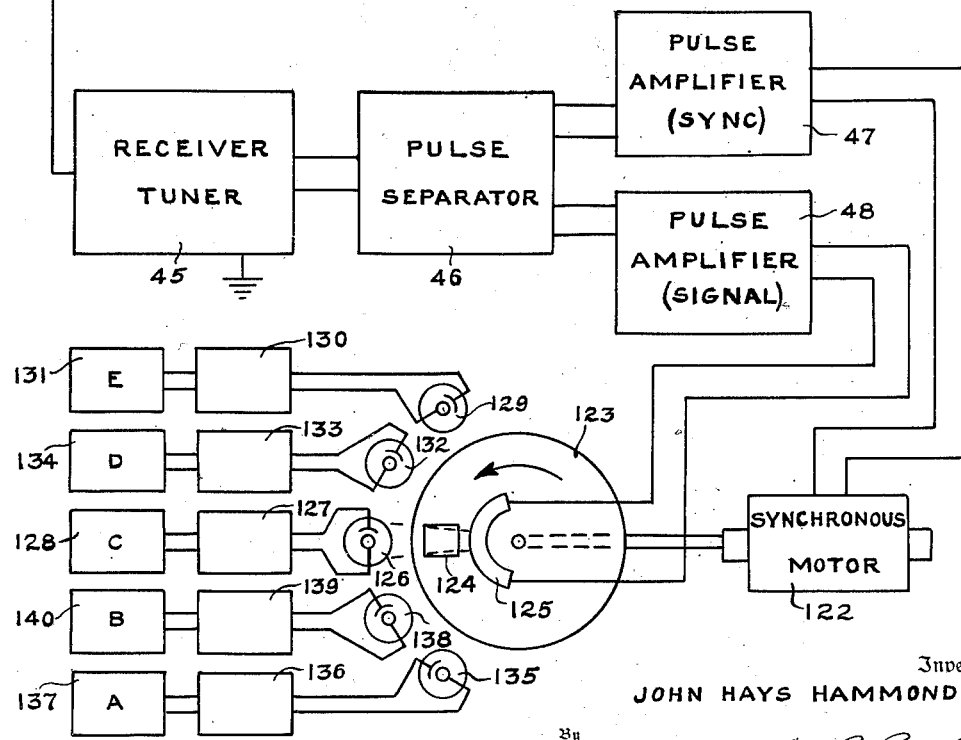
Inventor
JOHN HAYS HAMMOND, JR.
Attorney Patented Jan. 22, 1952

2,583,373

UNITED STATES PATENT OFFICE 2,583,373

SELECTIVE REMOTE-CONTROL SYSTEM

John Hays Hammond, Jr., Gloucester, Mass.

Application May 27, 1948, Serial No. 29,528

8 Claims. (Cl. 177—353)

This invention relates to a method of selective remote control by transmission of related repetitive trains of pulses. It relates especially to a method by which the relation of said transmitted trains controls the position of a rotating member at the receiver at the instant of flashing of a stroboscopic lamp. This is accomplished in general by causing one train of pulses to control the movement of the rotating member, and the other train of pulses to operate the lamp.

The invention will be better understood by referring to the following description taken in connection with the accompanying drawings in which certain specific embodiments have been set forth for purposes of illustration.

In the drawings:

Fig. 1 is a schematic block diagram showing a transmitting and receiving system in which the two pulse trains are sent on two independent transmission channels, and Fig. 2 is a similar schematic diagram showing a system in which the two trains are sent on a single transmission channel.

In Fig. 1, the rate of repetition of the pulses used is determined by the frequency of a source 10, which may be an electronic or other oscillator. The output of this source is connected to the input of an adjustable phase shifter 11 by which the output can be advanced or lagged in phase with respect to the input by various fixed amounts, in accordance with the setting of a control handle 11a. In the figure, these positions are designated, A, B, C, D, E corresponding to different desired control operations, such as may be involved in the control of an unattended radio relay station or in the remote control of a moving object. For position C, for example, the input and output wave forms may be in phase, for positions D and E the ouput may be advanced by say 15 and 30 degrees respectively and for positions B and A the output may be lagged by 15 and 30 degrees respectively. The input and output terminals of the phase shifter 11 are connected to the input of pulse formers 12 and 13 respectively. These may be of identical construction and so designed, for example, that an energy pulse is delivered at the output whenever the input sine wave to the pulse former passes through zero. With this arrangement the pulse repetition rate will be twice the frequency of the source 10. The pulses of the two trains delivered at the output of the pulse formers 12 and 13 will be simultaneous for position C of the control of phase shifter 11, but for positions D and E the output pulses of 13 will be time advanced with respect to those of 12, and for positions B and A they will be time lagged. The outputs of pulse formers 12 and 13 are connected to two modulators 14 and 15 respectively which modulate two radar pulse type transmitters 16 and 17, of frequencies designated $f_1$ and $f_2$ respectively. Thus in the transmitter 10 to 17 is provided a system of radiating two trains of pulses with the same repetition rates, but with a timing displacement of the two trains, which is controllable as to amount and sense by the setting of a control member of the phase shifter 11.

The receiver system includes a radio receiver 18 for the pulses emitted from transmitter 16 of frequency $f_1$ and a radio receiver 19 for the pulses emitted from transmitter 17 of frequency $f_2$. The pulse outputs of these receivers are connected to the inputs of two pulse amplifiers 20 and 21, which are not necessarily of like construction. The amplifier 20 may contain for example pulse form modification circuits so that the output is approximately of a sine wave nature fairly free from harmonics. The output of amplifier 20 is connected to a motor device such as a synchronous motor 22 which turns faithfully in synchronism with the pulse repetition frequency. Thus if the pulse repetition rate is for example twice the frequency of source 10, then the number of revolutions per second of the motor shaft may be twice the frequency in cycles of the source 10. It will be understood that any desired type of drive may be used which maintains the speed of rotation constant as determined by the drive source at the transmitter.

Mounted on the shaft of motor 22 is an opaque disc 23 in which there is cut an aperture or window 24 of suitable dimensions. For simplicity of illustration, the disc is considered to be rotating in the plane of the drawing, with the direction of rotation in the sense shown by the arrow. A stroboscopic lamp 25 is mounted in a fixed position such that its light, when flashed, will pass through the aperture 24 for a large proportion of the revolution of the disc, say 120 degrees. The pulse output of amplifier 21 is connected to the terminals of the lamp 25, so that the lamp is flashed in accordance with the arrival of pulse trains on the channel $f_2$, while the position of the aperture 24 at the instant of flashing of the lamp is determined by the time of arrival of pulse trains on channel $f_1$, the nature of the pulse amplifier 20, and the construction of the synchronous motor 22. The disc 23 may be adjustably connected to the shaft of motor 22, and so set or the aperture so cut that the aperture 24 is in the position shown when the light 25 is flashed, and with the transmitter control set at position C. This corresponds to the conditions of like timing of the two trains. Behind the aperture 24 is a photoelectric cell or other light operated device 26, so mounted as to receive maximum illumination from the lamp 25 when the lamp flashes with the aperture 24 in the position shown. The photoelectric cell 26 is connected to an integrating amplifier 27 which if desired may employ selective tuning to the pulse repetition rate, and may include a rectifier to produce a direct current output in accordance with the energization of the cell 26. The output of the amplifier 27 is connected to the work circuit 28 corresponding to the control function desired when the transmitter control is set at position C.

If now, the two trains of pulses are not simultaneous, the lamp will not flash at the instant the aperture 24 is in position to permit the lamp to illuminate cell 26. Thus if the control of the transmitter phase shifter 11 is advanced to position E, there will be no effect upon the motion of the motor 22, but the pulse on channel $f_2$ for driving the lamp 25 will be sent out somewhat prior to the corresponding pulse for driving the motor 22. Thus if this corresponds to 30° phase advance of the original source 10 and the pulse repetition rate is double that of the source 10, and the motor turns one revolution per pulse, then the aperture will be illuminated by the lamp 25 when the aperture lacks having arrived in line with cell 26, by sixty mechanical degrees. Therefore cell 29, operating into amplifier 30 and work circuit 31 is mounted to be illuminated by lamp 25 at its instant of flashing, when the transmitter control is at E. Correspondingly, the other cells 32, 35, 38 with suitable amplifiers 33, 36, 39 and work circuits 34, 37, 40 are mounted to be actuated from the lamp 25 when other control positions D, A, B respectively are chosen at the transmitter.

In this manner five control channels are provided using two independent channels for two trains of pulses of equal repetition rates, but with the relative timing of the two trains selectively determining the correlations between the transmitter control setting and the receiver work circuit actuation. Many modifications of the general arrangement are possible. Thus if there are to be moments when no control operation is desired, then a key may be used in the input to modulator 15 so that the signals for the lamp 25 may be omitted, leaving however the pulses for the motor 22 fully operative. Furthermore, other methods than two separate radio channels may be used for differentiating at the receiver as to which of the two pulse trains is to drive the motor and which is to drive the lamp. Such a method is indicated in Fig. 2, where parts corresponding to similar purposed or identical parts of Fig. 1 have numbers increased by one hundred over their counterparts in Fig. 1.

In Fig. 2, the repetition rate is determined by oscillator 110 which is applied directly to a former of positive pulses 41 and through a phase shifter 42 to a former of negative pulses 43. Thus the differentiation between the two trains at the receiver will be determined by the sense of the pulses, instead of the channels on which they are transmitted. Accordingly in the present instance, the transmission from transmitted to receiver may be on a single channel of frequency $f$, which radiates a carrier wave which is pulsed to yield a greater output by one train of pulses, and to yield a lesser output by the other train of pulses. This transmitter 44, actuated both by the positive pulses produced by pulse former 41 and the negative pulses produced by pulse former 43 may be of the television type. In the present instance, there should of course be no control position in which the positive pulses occur at the same time as the negative pulses. Therefore the phase shifter 42 of Fig. 2 has no position of zero phase shift, but the positions A to E may correspond to phase advances say 15, 30, 45, 60 and 75 electrical degrees. In this manner two pulse trains of the same repetitive rate can be sent from the same transmitter, differently characterized as to sense of pulsing, and as to times of pulsing.

At the receiver of Fig. 2, the tuner 45 receives and detects the pulse modulated carrier wave from transmitter 44, and delivers the demodulated output including the combined positive and negative pulse trains to a pulse separator 46. This may be constructed in accordance with well known principles in the radar pulse and television arts, involving for example direct pulse clipping to separate out the positive pulse train, and involving phase reversal and pulse clipping to produce a pulse train corresponding to the negative pulses received. The separated pulse train corresponding in timing to the pulse train produced by pulse former 41 is diverted to a pulse amplifier 47, while the separated pulse train corresponding in timing to that produced by pulse former 43 is diverted to a pulse amplifier 48. Thereupon the output of amplifier 47, suitably converted to approximately a sine wave train, operates a synchronous motor 122, while the output of amplifier 48 drives a stroboscopic lamp 125. The general arrangement of a motor, lamp and other circuits associated therewith is similar to that of Fig. 1, providing for selective operation of the receiver work circuits 137, 140, 128, 134, 131, in accordance with the settings of the transmitter phase control settings C, E, D, A and B respectively.

This system is suitable for various selection and control systems such as the control of the various elements of a radio relay station, a teletyping system, receiver tuning or selection, control of moving objects or in general any system requiring selection and actuation of a large number of work circuits.

Various other forms of control arrangements are possible within the scope of my invention, which is to be limited only by the scope of the following claims.

What is claimed is:

1. A selective control system responsive to two series of received pulse trains with the same repetitive rate and a predetermined timing difference between corresponding pulses of said two trains, comprising a receiver having means for recreating said pulse trains, and selective means including a mechanical member driven in accordance with the timing of one of said trains, a photo lamp energized in accordance with the timing of the other of said trains, and a plurality of photosensitive elements progressively positioned along the path of said mechanical member to be selectively energized in accordance with the timing difference between said trains.

2. A system, as set forth in claim 1, in which the mechanical member comprises an apertured disc driven in synchronism with the pulse of said one train and interspersed between said photo lamp and said photosensitive elements.

3. A system, as set forth in claim 2, in which said photosensitive elements are disposed along the path of said aperture and are angularly displaced according to the various timing differences of said trains.

4. A system, as set forth in claim 3, including work circuits controlled by the respective photosensitive devices.

5. A system, as set forth in claim 1, in which the respective pulse trains are transmitted over separate channels.

6. A system, as set forth in claim 1, in which the pulse trains constitute polarized pulses, and the receiver includes circuits responsive to the respective received pulses.

7. A selective indicator of the relative timing of two trains of pulses, comprising a rotary member driven in accordance with the pulses of one of said trains, a photo lamp driven by the pulses of the other of said trains; and a plurality of photosensitive elements differently exposed to said photo lamp in accordance with the angular position of said rotating member at the time of flashing of said photo lamp.

8. A selective control comprising a receiver for carrier waves, modulated by a pair of pulse trains, demodulating means to select and reproduce the pulse trains, a rotary member, means driving said member in synchronism with one of said pulse trains, a photo lamp energized by the other pulse train and a series of photosensitive devices positioned with respect to said rotary member to be selectively energized by the flashing of said photo lamp in accordance with the relative timing of the pulses of the two trains.

JOHN HAYS HAMMOND, Jr.

REFERENCES CITED

The following references are of record in the file of this patent:

UNITED STATES PATENTS

| Number | Name | Date |
|---|---|---|
| 463,852 | Bradley | Nov. 24, 1891 |
| 1,971,191 | Lord | Aug. 21, 1934 |
| 2,057,773 | Finch | Oct. 20, 1936 |
| 2,240,800 | Rigert | May 6, 1941 |
| 2,268,133 | Carlson | Dec. 30, 1941 |
| 2,321,971 | Becker | June 15, 1943 |
| 2,369,783 | Homrighous | Feb. 20, 1945 |
| 2,396,211 | Skellett | Mar. 5, 1946 |
| 2,411,147 | Cooley | Nov. 19, 1946 |
| 2,415,359 | Loughlin | Feb. 4, 1947 |
| 2,424,900 | Purington | July 29, 1947 |
| 2,444,741 | Loughlin | July 6, 1948 |
| 2,444,950 | Nichols | July 13, 1948 |
| 2,449,819 | Purington | Sept. 21, 1948 |